United States Patent [19]

Manchester et al.

[11] 4,109,945
[45] Aug. 29, 1978

[54] APPARATUS FOR CONNECTING TOGETHER FLOWLINE END PORTIONS

[76] Inventors: Luther L. Manchester, 810 Woodstock, Bellaire, Tex. 77401; Bobby J. Reneau, 15527 Morales, Houston, Tex. 77032

[21] Appl. No.: 765,940

[22] Filed: Feb. 7, 1977

[51] Int. Cl.² .......................................... F16L 21/04
[52] U.S. Cl. .................................. 285/323; 285/93; 285/165
[58] Field of Search ................ 285/18, 323, 322, 165, 285/164, 302, 343, 421

[56] References Cited

U.S. PATENT DOCUMENTS

| 3,704,033 | 11/1972 | Arnold | 285/322 X |
|---|---|---|---|
| 3,977,702 | 8/1976 | White, Jr. et al. | 285/145 X |
| 3,986,728 | 10/1976 | Marsh | 285/322 X |
| 3,999,782 | 12/1976 | Shotbolt et al. | 285/323 X |
| 4,006,921 | 2/1977 | Mohr | 285/343 X |

Primary Examiner—Thomas F. Callaghan
Attorney, Agent, or Firm—Pravel, Wilson & Gambrell

[57] ABSTRACT

A grip-seal apparatus for connecting together flowline end portions including first and second housings having alignable bores therethrough and an intermediate housing connection section for connection to each of the first and second housings and also having a bore for receiving a first flowline end portion. A radially contractable actuator sleeve is mounted within the bore of the first housing for movement radially inwardly into gripping engagement with the first flowline end portion in response to camming action; and, a sealing assembly is mounted in the bore of the second housing for movement radially inwardly into sealing engagement with the first flowline end portion in response to longitudinal movement of an activating sleeve which is mounted within the second housing bore in engagement with the sealing assembly. The second housing is connectable to various types of flanges for connection to another grip-seal apparatus attached to a second flowline end portion or for connection directly to the second flowline end portion whereby fluid flow between the first and second flowlines is established.

15 Claims, 8 Drawing Figures

U.S. Patent  Aug. 29, 1978  Sheet 1 of 2  4,109,945
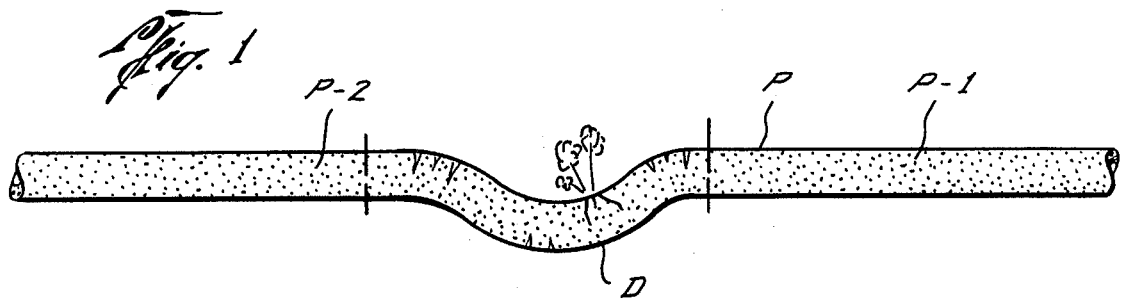
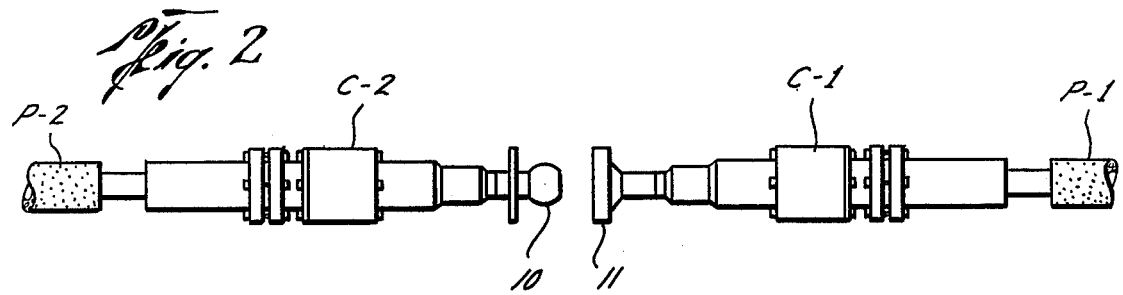
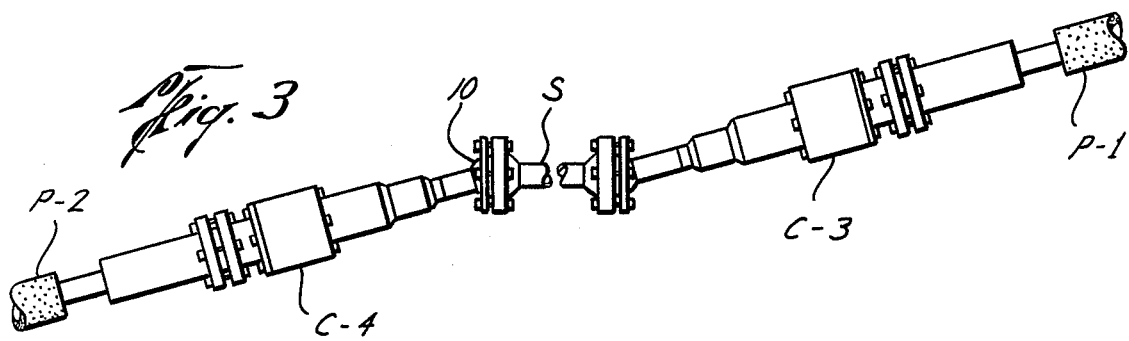
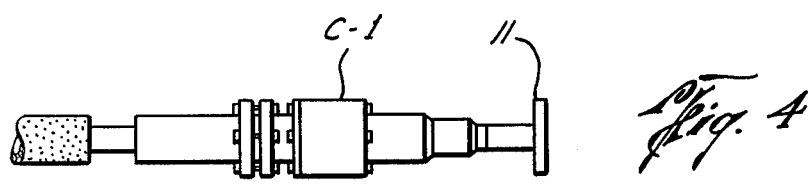
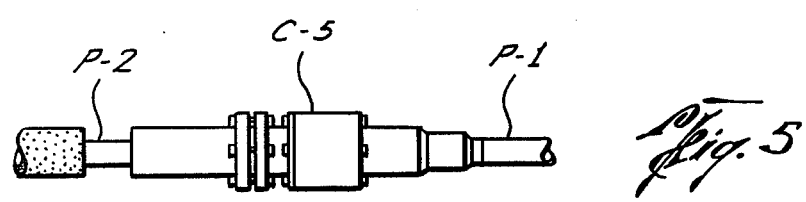

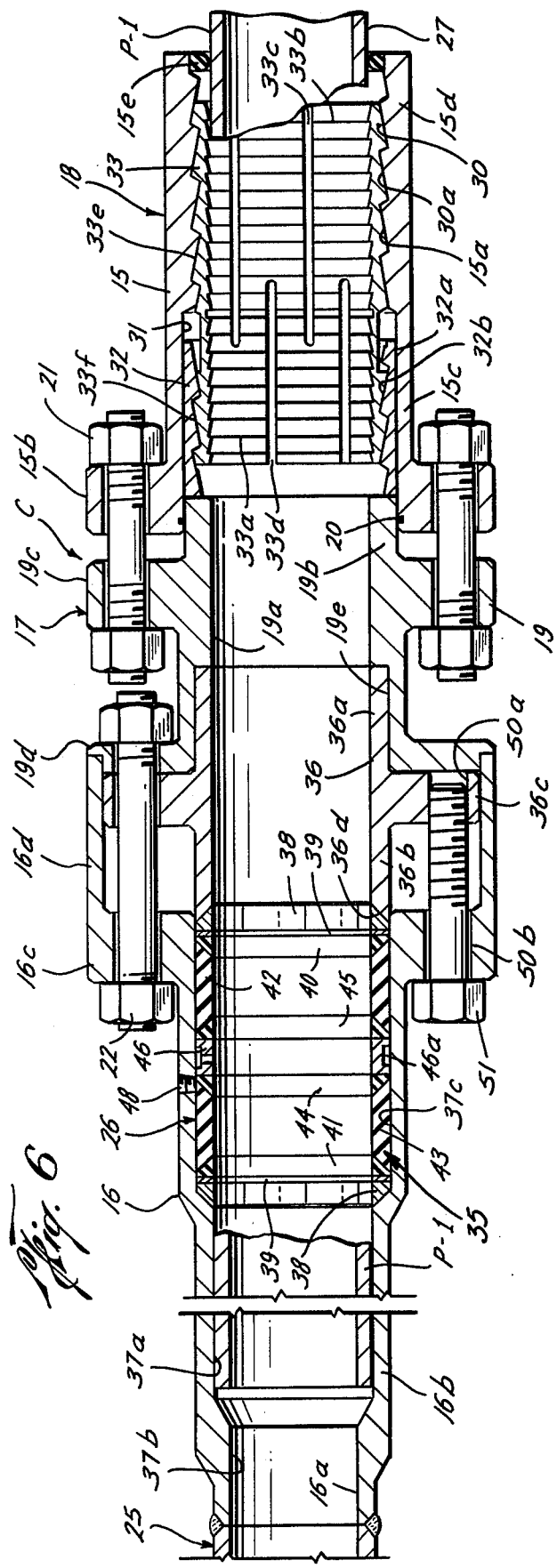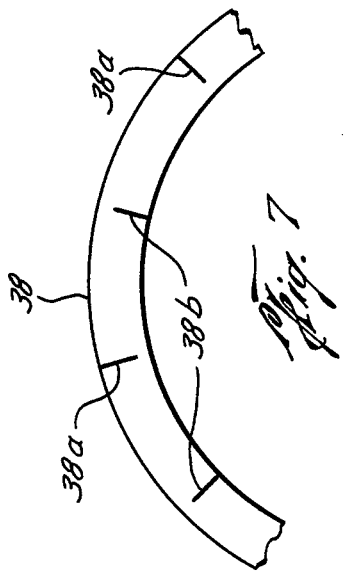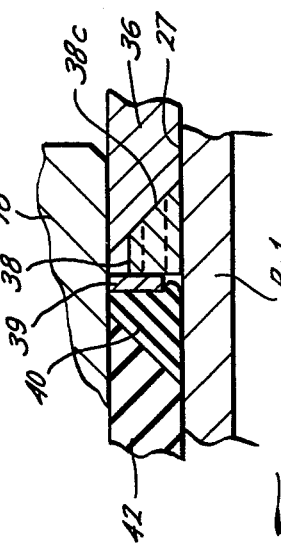

APPARATUS FOR CONNECTING TOGETHER FLOWLINE END PORTIONS

BACKGROUND OF THE INVENTION

The field of this invention relates to the connection together of first and second tubular members for fluid flow therebetween and in particular, to the re-establishment of a connection between severed portions of an underwater pipeline.

The tremendous amount of offshore oil and gas well drilling and production has precipitated more and more underwater pipelines which carry the produced oil and/or gas to storage facilities located either in the water or on the nearest land mass. Typically, these underwater pipelines are comprised of sections of pipe which are interconnected by welding and weight-coated with concrete to insure negative buoyancy so that the pipeline will rest upon the ocean floor. Such pipelines need repair from time to time due to corrosion, failure of welded connections or for other reasons. Typically, in making repairs to an underwater pipeline, it is necessary to remove a damaged section and replace that section with a new, undamaged pipeline section. Such replacement requires underwater welding, which is an extremely time-consuming and technically difficult task. Various coupling devices have been developed to eliminate the need for underwater welding. The problems with making any type of underwater connection between the undamaged portions of an underwater pipeline are universal. First of all, any apparatus which is positioned between the undamaged ends of the pipeline must be able to connect to such undamaged ends in spite of the undamaged portion of the pipe being of a slightly unpredictable diameter due to manufacturing tolerances. The undamaged portions of the pipeline may also be corroded or out of round. All of these factors contribute to make actual pipeline conditions for insertion of a coupling device between undamaged portions of a pipeline unpredictable. Further difficulties are encountered due to the fact that such pipelines are being laid at greater and greater depths; for the greater the depths of the pipeline, the more difficult are the working conditions for the divers accurately installing a coupling device for connecting together the undamaged portions of the pipeline.

SUMMARY OF THE INVENTION

It is an object of this invention to provide a new and improved grip-seal apparatus for insertion between the severed end portions of a damaged underwater pipeline having a damaged section removed for connecting the severed end portions together underwater in spite of some unpredictability being present in the actual size and roundness and surface integrity of the pipe end portions.

It is a further object of this invention to connect together for fluid flow such severed end portions of an underwater pipeline in spite of the severed portions being at varying distances and at varying positions of non-alignment with respect to each other.

It is a further object of this invention to provide a grip-seal apparatus which receives one of the pipeline end portions to be connected on the inside of the apparatus and mechanically grips and seals the apparatus into connection with the one pipeline portion and further includes means for connecting the apparatus either directly to the second pipeline end portion or indirectly thereto through a ball joint connection, a straight flange connection or through another grip-seal apparatus connected to the second pipeline end portion.

These objects and other objects of this invention are set out in greater detail in the description to follow and should not be interpreted as being anything more than a mere summary of the objects of this invention. These objects and other objects of this invention are carried out by the grip-seal apparatus of the preferred embodiment of this invention for connecting together first and second flowline end portions for fluid flow therebetween. Such grip-seal apparatus includes first and second housings having alignable bores therethrough for at least partly receiving a first flowline end portion. A housing interconnection section is mounted between the first and second housings for connection to each of the first and second housings. The housing interconnection section also has a bore for receiving the first flowline end portion. An actuator sleeve is mounted within the bore of the first housing for movement radially inwardly into gripping engagement with the first pipeline portion in response to the connection of the first housing to the housing interconnection section.

A sealing assembly is mounted within the bore of the second housing and is movable into sealing engagement with the outside surface of the first flowline end portion by means of an activator sleeve which is operable from outside of the second housing. The second housing is connectable to a ball joint, a straight flange or directly to the second flowline end portion.

A second grip-seal apparatus may also be connected to the second flowline end portion for connection to the first grip-seal apparatus through a ball joint flange connection or a straight flange connection in order to connect together the first and second severed flowline end portions in spite of such pipeline portions being located at various distances and various alignments with respect to each other.

BRIEF DESCRIPTION OF THE DRAWINGS

FIG. 1 is a top view of an underwater pipeline or flowline having a damaged area which must be replaced;

FIG. 2 is a top view of the utilization of two grip-seal devices of this invention for connecting together the severed end portions of the pipeline;

FIG. 3 is a top view of the utilization of two grip-seal devices of this invention with an intermediate spool for connecting together the severed end portions of the underwater pipeline which are located at a greater distance apart than illustrated in FIG. 2;

FIG. 4 is a top view of the grip-seal apparatus of this invention connected to one of the severed pipeline end portions and terminating in a straight flange for connection to the other severed pipeline portion;

FIG. 5 is a top view of the grip-seal apparatus of this invention attached to one severed pipeline end portion and being directly connected to the second pipeline end portion;

FIG. 6 is a section view of the grip-seal apparatus of this invention;

FIG. 7 is an enlarged view of a part of the sealing assembly which sealingly engages the inserted pipeline end portion; and FIG. 8 is a partial view of the radially contractable ring of the sealing assembly.

DESCRIPTION OF THE PREFERRED EMBODIMENT

Referring to the drawings and in particular to FIG. 1, the letter P generally designates a pipeline or flowline which is located underwater and has a damaged area D which must be replaced. The first step in making such replacement is to utilize underwater divers to remove the damaged portion D, which leaves severed pipeline end portions P-1 and P-2 which must then be connected together again for transferring fluid such as oil or gas through the pipeline. FIG. 2 illustrates the utilization of two grip-seal devices C-1 and C-2 which are connected to the severed pipeline end portions P-1 and P-2 and then to each other underwater in order to re-establish fluid flow through the pipeline. FIG. 3 illustrates a modification in the utilization shown in FIG. 2 of two grip-seal devices C-3 and C-4. In FIG. 3, the severed pipeline end portions P-1 and P-2 are located a further distance apart than in FIG. 2 and are also in a position of non-alignment with respect to each other. The grip-seal devices C-3 and C-4 are connected to the severed pipeline end portions P-3 and P-4 and to each other through an intermediately located pipeline spool S.

The grip-seal apparatus C-2 which terminates in a ball joint flange connection 10 is also usable alone to connect together the pipeline portions P-1 and P-2. In this situation, the grip-seal apparatus C-2 grips and seals one of the pipeline portions such as P-2 and connects to the other pipeline portion such as P-1 having a standard flange welded on the end thereof. The grip-seal apparatus C-1 which terminates in a straight flange 11 may also be used by itself to make direct connection to a flange welded onto the end of the other pipeline portion to be connected. And, in a further application, a grip-seal apparatus C-5 is illustrated in FIG. 5. The grip-seal apparatus C-5 is adapted to grip and seal one pipeline portion P-2 and is directly connected by welding to the other pipeline portion such as P-1. In all of these various embodiments and applications, the same grip-seal apparatus, which is generally designated by the letter C in FIG. 6, is utilized. The only difference in the various applications C-1 through C-5 illustrated in FIGS. 2–5 is the end connection which connects the grip-seal apparatus to one pipeline end portion.

Basically, the grip-seal apparatus C illustrated in FIG. 6 includes a first housing 15 which is connected to a second housing 16 through a housing interconnection means 17. The first housing 15 is a hollow, cylindrical member having a bore generally designated as 15a extending therethrough for receiving one of the severed pipeline end portions such as P-1. Gripper means generally designated by the member 18 is mounted in the first housing bore 15a for movement radially inwardly into gripping engagement with the first flowline end portion P-1. The first housing 15 terminates in a standard flange 15b.

The housing interconnection means 17 is formed of a generally cylindrical or tubular member 19 having bore 19a therethrough. The tubular member 19 or housing interconnection section 19 includes an internal sleeve portion 19b having an outer diameter substantially equal to the diameter of a part of the bore 15a of the first housing 15 at end 15c on which the flange 15b is mounted. An O-ring 20 is positioned in a groove machined in the bore 15a for providing a seal between the bore and the internal sleeve 19b. An exterior flange portion 19c is located at approximately the middle of the generally cylindrical member 19b for alignment with the first housing flange 15b for the receipt of connecting bolts 21. Thus the housing interconnection section 19 is connected to the first housing 15 through the connection of flanges 15b and 19c together. The housing interconnection section 19 terminates at the other end in a exterior flange 19d.

The second housing 16 has a bore generally designated as 16a therein for partly receiving the pipeline portion P-1 which extends through the bore 19a of the housing interconnection section 19 and through the bore 15a of the first housing 15. The second housing 16 includes a generally cylindrical or tubular section 16b which terminates in a flange portion 16c having an outer sleeve portion 16d which fits into a ledge on the flange 19d of the intermediate housing section 19. A plurality of connecting bolts 22 extend through circumferentially spaced openings in the second housing flange portion 16c and through circumferentially spaced openings in the intermediate connecting section flange portion 19d for connecting the second housing 16 to the housing interconnection section 19. Means generally designated by the number 25 are provided at the outer end of the second housing 16 for connecting the second housing to another tubular member such as P-2. As previously described, such second housing connector means 25 may be a ball joint flange connection 10, a straight flange 11, a ball joint 10 utilized in connection with a spool S or a welded connection directly to the other pipeline portion P-2.

Sealing means generally designated by the number 26 are mounted in the second housing bore 16a for receiving the pipeline end portion P-1 and for moving into sealing engagement therewith in order to prevent the passage of fluid between the pipeline end portion P-1 and the wall of the second housing bore 16a.

The gripper means 18 mounted within the bore 15a of the first housing 15 is provided for movement into gripping engagement with the exterior surface 27 of the pipeline end portion P-1 in response to the connection of the housing interconnection section 19 to the first housing 15. The bore generally designated as 15a of the first housing section 15 includes a first portion 30 having a plurality of camming surfaces 30a which are formed by a continuous spiralled groove or thread. The camming surfaces 30a are inclined radially outwardly from housing open end 15d toward housing flange end 15c. The open housing end 15d also has a resilient seal ring 15e positioned therein for at least partly wiping the exterior pipeline portion surface 27 as the pipeline end portion P-1 is moved into the bore 15a.

The first housing bore 15a further includes a section portion 31 having an overall inner diameter larger than the diameter of the first bore portion 30 at any point. The wall forming the second bore portion 31 is smooth and slidably mounts a force transfer sleeve 32 therein. The force transfer sleeve 32 has an exterior surface 32a which is smooth and has an outer diameter approximately equal to the inner diameter of the second bore portion 31 such that the force transfer sleeve is slidably mounted for movement longitudinally along the second bore portion 31. The inner surface of the force transfer sleeve 32 has a plurality of camming or wedging surfaces 32b which extend radially outwardly in the direction from housing flange end 15c to housing open end 15d.

An actuator sleeve 33 is mounted inside of the first bore portion 30a of the first housing 15 and inside of the force transfer sleeve 32 for movement radially inwardly into gripping engagement with the outside pipeline end portion surface 27. The actuator sleeve 33 is a generally cylindrical, hollow member having an inside surface of a diameter initially slightly greater than the outside diameter of the pipeline portion surface 27. The inside surface includes oppositely threaded portions 33a and 33b for engaging the pipeline portion surface 27. A plurality of circumferentially spaced slots 33c extend longitudinally through one portion of the actuator sleeve 33 and a second plurality of circumferentially spaced, longitudinally extending slots 33d extend longitudinally through the other portion of the sleeve 33. These slots overlap and cooperate to make the actuator sleeve 33 radially compressible.

The actuator sleeve 33 has a first outside surface portion consisting of a plurality of camming or wedging surfaces 33e which are adapted to mate and engage the camming surfaces 30a in the first housing bore 15a. The wedging surfaces 33e on the actuator sleeve 33 extend radially outwardly in a direction from open end 15d towards flange end 15c. The surfaces 33 are provided by a spiral machining technique for engaging the correspondingly spiralled wedging surfaces 30a.

The actuator sleeve 33 includes a second plurality of outside wedging surfaces 33f which engage the camming or wedging surfaces 32b on the force transfer sleeve 32. The camming surfaces 33f are spiralled to complement the spiralled surfaces 32b and extend radially outwardly in a direction from open housing end 15d towards flange housing end 15c for complementary engagement against the wedging surfaces 32b of the force transfer sleeve 32.

In operation, the inner sleeve 19b of the intermediate housing section 19 is inserted into the enlarged bore portion 31 of the first housing upon connection of the flanges 15b and 19c by bolts 21. In this position, the inner sleeve 19b is in initial engagement with the force transfer sleeve 32. After insertion of the pipeline end portion P-1 all the way through first housing bore 15a, through intermediate housing section bore 19a and into the second housing bore 16a, the bolts 21 are further tightened. Further tightening of the bolts 21 moves the internal sleeve 19b further into the first housing bore portion 31 thus moving longitudinally the force transfer sleeve 32. Movement of the force transfer sleeve 32 longitudinally toward the open housing end 15d causes surfaces 32b to wedge and cam against the opposing actuator sleeve surfaces 33f thus moving the actuator sleeve radially inwardly into gripping engagement against the pipeline end portion surface 27. The exertion of force through force transfer sleeve 32 upon the actuator sleeve 33 in the direction of open housing end 15d serves to cause the housing camming surfaces 30a to cam and wedge against the mating camming surfaces 33e on the other portion of the actuator sleeve to move the remainder of the actuator sleeve 33 into gripping engagement with the pipe. The radial contraction of the actuator sleeve 33 due to such camming action occurs in response to the connection of the flange 19c on the intermediate housing section 19 to the flange 15b of the first housing.

It is noted that the number of spirals of camming surfaces 30a is greater than the number of spirals of camming surfaces 33f on the force transfer sleeve; and therefore, the number of spirals of camming surfaces 33e on actuator sleeve 33 is greater than the number of spirals of camming surfaces 33f. The reason for the disparity in the number of spirals is based upon anticipated compensation for stress exerted upon the first housing 15 by the pipeline P itself. The mating force transfer sleeve surfaces 32b and actuator sleeve surfaces 33f react to absorb compressive forces exerted by the pipeline P on the grip-seal apparatus C. Conversely, the housing camming surfaces 30a cooperate with the actuator sleeve camming surfaces 33e to resist tension forces within the pipeline P. The number of caming surfaces and thus the surface area of resistance provided by camming surfaces 30a and 33e is greater than the surface area provided by camming surfaces 32b and 33f because the strength of the materials utilized in the grip-seal apparatus C are greater in compression than in tension, thus requiring greater distribution for tension forces than compression forces in order to prevent failure under stress conditions.

The sealing means 26 includes a sealing assembly 35 mounted in the second housing bore 16a for movement by activating sleeve 36 radially inwardly into sealing engagement with the outside surface 27 of the pipeline end portion P-1.

The second housing bore 16a includes an intermediate bore portion 37a having a diameter approximately equal to the outside diameter of the pipeline end portion P-1 for receiving same. An outer bore portion 37b has a reduced diameter approximately equal to the inside diameter of the pipeline portion P-1 for the purpose of transferring fluid from the pipeline portion P-1 to the pipeline portion P-2 without a substantial variation in the pipeline flow path. A third, enlarged bore portion 37c is provided at the second housing end which is connected to the intermediate housing section 19. The bore portion 37c has a diameter greater than the diameter of the outside pipeline surface 27c for mounting in the annular space therebetween the sealing assembly 35.

The sealing assembly 35 includes outside, radially contractable rings 38. Referring in particular to FIGS. 7 and 8, the radially contractable rings 38 are machined to an original diameter approximately equal to the anticipated diameter of the outside pipeline surface 27. The rings are then slotted by a plurality of outside radial slots 38a circumferentially spaced about the rings and inside radial slots 38b circumferentially spaced about the rings between the outside slots. The rings are then expanded to a greater diameter to conform and fit within the enlarged bore portion 37c. Two retainer rings 39 are positioned inside of the contractable rings 38. Camming rings 40 and 41 are positioned to the inside of the two retaining rings 39. Resilient sealing sleeves 42 and 43 are mounted inside of the camming rings 40 and 41. Additional camming rings 44 and 45 are mounted on the inside of the sealing sleeves 42 and 43; and, a lantern ring 46 is positioned between the inside camming rings 44 and 45. The resilient sealing sleeves 42 and 43 are made of a material suitably resilient to radially expand under compression to move into resilient, sealing engagement with the pipeline end portion P-1. The camming rings 40, 41, 44 and 45 are made of a material harder than the resilient sealing sleeves 42 and 43. For example, if the resilient sealing sleeves 42 and 43 are made of a resilient rubber, the camming rings 40, 41, 44 and 45 may be made of a harder rubber. The camming rings and resilient sleeves are provided with cooperating camming surfaces such that the camming rings serve to confine the sealing sleeves 42 and 43 against the wall of bore 37c even as the entire sealing assembly is compressed by the activator sleeve 36. The lantern ring 46 is made of a suitable material such as a metal and includes an outside groove 46a alignable with the housing opening 48 for detecting leaks prior to service.

The activating sleeve 36 includes a first sleeve portion 36a, a second sleeve portion 36b and a flange portion 36c which is located between the sleeve portions 36a and 36b. The sleeve portion 36a is slidably mounted within a circumferential recess 19e in the intermediate housing section bore 19a. The sleeve 36b terminates in an inclined surface 36d which engages a complementary inclined surface 38c on the radially contractable ring 38 mounted in second housing bore 37c. The flange portion 36c of the activator sleeve 36 has openings 50a which align with circumferentially spaced openings 50b in the second housing flange portion 16c. Bolts 51 are mounted in the second housing section flange portion 50b and extend into threaded engagement in openings 50a of the activator sleeve flange portion 36c. Rotation of the bolts 51 in one direction will cause longitudinal movement of the activator sleeve 36 toward the entire sealing assembly 35 thereby compressing the resilient sealing sleeves 42 and 43 radially inwardly into sealing engagement with the outside pipeline surface 27. The camming action between activator sleeve end surface 36d and the complementary inclined surface 38c of the contractable ring 38 acts to cause the ring 38 to radially contract into radial engagement with the pipeline outside surface 27 thereby preventing extrusion of the camming ring 40. The radially inward movement or contraction of the contractable ring 38 is actually a return of the ring 38 to its original diameter.

The openings 50b for the activator sleeve bolts 51 are alternately spaced about the openings for the bolts 22 in flange portion 16c, which bolts 22 connect the second housing 16 to the intermediate housing section 19. The number of bolts 51 as opposed to the number of bolts 22 utilized, and the relative size of the bolts 51 and 22 will depend upon the particular utilization of the apparatus C.

The foregoing disclosure and description of the invention are illustrative and explanatory thereof, and various changes in the size, shape and materials as well as in the details of the illustrated construction may be made without departing from the spirit of the invention.

We claim:

1. Grip-seal apparatus for connecting first and second flowline members for fluid flow therethrough, comprising:
   a first housing having a bore therethrough for receiving a first flowline member;
   a second housing having a bore therethrough adapted for partly receiving such first flowline member extending through said first housing section bore;
   housing interconnection means for attachment to said first and second housings to interconnect same;
   gripper means mounted in said first housing bore for moving radially inwardly into gripping engagement with such first flowline member simultaneously with connection of said housing interconnection means to said first housing;
   sealing means mounted in said second housing bore for movement radially inwardly into sealing engagement with said first flowline member, said sealing means includes:
   a resilient annular sealing assembly mounted in said second housing section bore adapted for receiving said first flowline member;
   a sealing assembly activating sleeve mounted in said second housing bore for movement longitudinally into engagement with said sealing assembly for urging said sealing assembly into sealing engagement with said first flowline member;
   said second housing including second housing connector means for connecting said second housing section to a second flowline member in order to establish fluid flow between said first and second flowline member; and
   said housing interconnection means including an intermediate housing section having a bore therethrough and being mounted between said first and second housings and including a first housing section connection means for connecting said first housing section with said intermediate housing section and a second housing section connection means for connecting said second housing section with said intermediate housing section, said intermediate housing section including means mounted in operative engagement with said gripper means and for longitudinal movement in said first housing bore in response to said first housing connection means connecting said first housing and intermediate housing section together, said gripper means moving radially inwardly into gripping engagement with such first flowline member in response to connection of said intermediate housing section and said first housing.

2. The structure set forth in claim 1, wherein said gripper means includes:
   a cylindrical actuator sleeve having a bore therethrough for mounting said sleeve within said first housing section bore about such first flowline member; and
   camming means for moving said actuator sleeve radially inwardly into gripping engagement with said first flowline member in response to said connection of said intermediate housing section to said first housing.

3. The structure set forth in claim 2, wherein said gripper means further includes:
   a cylindrical force transfer sleeve mounted in said first housing section bore about said actuator sleeve for engaging said first housing bore and said actuator sleeve for moving said actuator sleeve radially inwardly into gripping engagement with such first flowline member.

4. The structure set forth in claim 3, including:
   said force transfer sleeve being engaged by said intermediate housing section and being moved longitudinally with said intermediate housing section; and
   said force transfer sleeve and a first portion of said actuator sleeve having cooperating camming surfaces that move said first portion of said actuator sleeve radially inwardly in response to longitudinal movement of said force transfer sleeve.

5. The structure set forth in claim 4, including:
   said first housing bore having an inside wall portion formed of camming surfaces and said actuator sleeve having a second portion with camming surfaces which engage said inside bore wall portion camming surfaces for interaction to move said actuator sleeve radially inwardly into gripping engagement with such first flowline member simultaneously with movement of said first portion of said actuator sleeve radially inwardly by said force transfer sleeve.

6. The structure set forth in claim 5, wherein:
said area of camming surfaces between said actuator sleeve and said first housing section bore portion is greater than the area of camming surfaces between said actuator sleeve and said force transfer sleeve.

7. The structure set forth in claim 3, wherein said housing interconnection means includes:
said intermediate housing section including a first sleeve portion mounted in engagement with said force transfer sleeve; and said first housing connection means including
flange connection means for connecting said first housing to said intermediate housing section and for moving said intermediate housing section toward said first housing during such connection for causing said sleeve portion to longitudinally move said force transfer sleeve in order to move said actuator sleeve radially inwardly into gripping engagement with said first flowline member.

8. The structure set forth in claim 1, wherein said activating sleeve including a first sleeve portion and a flanged portion mounted in said second housing section bore for longitudinal movement therein, said second housing including activating sleeve connector means for connecting said flanged portion of said activating sleeve to a flanged portion of said second housing for moving said activating sleeve longitudinally to activate said sealing assembly.

9. The structure set forth in claim 8, wherein said sealing assembly includes:
a ring which is radially contractable in response to longitudinal movement of said sealing assembly activating sleeve.

10. The structure set forth in claim 9, including:
said ring having a plurality of radially directed slits for expanding said ring from an original to an enlarged diameter for initially receiving said first flowline member, said ring being moved to a contracted position approximating its original diameter by engagement with said sealing assembly activating sleeve.

11. The structure set forth in claim 7, wherein said intermediate housing section further includes:
said second housing connection means being longitudinally spaced from said first housing connection means for affixedly connecting said intermediate housing section to said second housing.

12. The structure set forth in claim 11, wherein said second housing includes:
a flanged portion having an outer sleeve formed therewith, said second housing connection means of said intermediate housing section being positioned within said second housing outer sleeve and connected to a second housing flanged portion of said second housing connection means.

13. The structure set forth in claim 8, including:
said activating sleeve further including a second sleeve portion extending into said bore of said intermediate housing section.

14. The structure set forth in claim 5, including:
said actuator sleeve, force transfer sleeve and said first housing bore portion which engages said actuator sleeve having a plurality of camming surfaces, said camming surfaces on said first portion and second portion of said actuator sleeve having a plurality of surfaces inclined in opposite directions.

15. The structure set forth in claim 2, including:
said cylindrical actuator sleeve is a one-piece member having two sets of circumferential slots machined therein to allow for radial movement of said sleeve.

* * * * *

UNITED STATES PATENT AND TRADEMARK OFFICE
CERTIFICATE OF CORRECTION

PATENT NO. : 4,109,945
DATED : August 29, 1978
INVENTOR(S) : Luther L. Manchester and Bobby J. Reneau It is certified that error appears in the above-identified patent and that said Letters Patent are hereby corrected as shown below:

Column 3, line 53, delete "member" and insert --number--.

Signed and Sealed this

Second Day of September 1980

[SEAL]

Attest:

SIDNEY A. DIAMOND

Attesting Officer     Commissioner of Patents and Trademarks